United States Patent [19]

Demopolis

[11] Patent Number: 5,512,604
[45] Date of Patent: Apr. 30, 1996

[54] POROUS COPOLYMERS HAVING A CELLULAR POLYMERIC STRUCTURE SUITABLE FOR PREPARING ION-EXCHANGE RESINS AND ADSORBENTS

[75] Inventor: Tom N. Demopolis, Midland, Mich.

[73] Assignee: The Dow Chemical Company, Midland, Mich.

[21] Appl. No.: 937,800

[22] Filed: Aug. 28, 1992

[51] Int. Cl.$^6$ ............................... C08F 14/00; C08J 5/20
[52] U.S. Cl. ............................... 521/142; 521/25; 521/38; 521/114; 521/117; 521/130; 521/131; 521/134; 521/143; 521/145; 521/146; 521/147; 521/148; 521/149; 521/150; 264/41
[58] Field of Search ............................... 521/145, 25, 38, 521/114, 117, 131, 130, 134, 142, 143, 147, 146, 148, 149, 150; 264/41

[56] References Cited

U.S. PATENT DOCUMENTS

| | | |
|---|---|---|
| 2,268,160 | 6/1939 | Miles . |
| 2,275,164 | 12/1939 | Thomas et al. . |
| 2,371,868 | 3/1945 | Berg et al. . |
| 2,389,865 | 11/1945 | Mills et al. . |
| 2,442,940 | 6/1948 | Staudinger et al. . |
| 2,498,621 | 2/1950 | Kropa et al. . |
| 2,500,149 | 3/1950 | Boyer . |
| 2,505,353 | 4/1950 | Fisk . |
| 2,525,227 | 10/1950 | Laube . |
| 2,597,440 | 5/1952 | Bodamer . |
| 2,597,494 | 5/1952 | Hwa . |
| 2,631,127 | 3/1953 | D'Alelio . |
| 2,664,801 | 1/1954 | Eisbein . |
| 2,764,564 | 9/1956 | McMaster et al. . |
| 2,777,824 | 1/1957 | Leeds . |
| 2,783,894 | 3/1957 | Lovell et al. . |
| 2,800,445 | 7/1957 | Clark . |
| 2,848,428 | 8/1958 | Reubens . |
| 2,878,194 | 3/1959 | Reubens . |
| 2,888,441 | 5/1959 | Morris . |
| 2,911,382 | 11/1959 | Barkbuff, Jr. et al. . |
| 2,960,480 | 11/1960 | Thielen . |
| 2,992,544 | 7/1961 | McMaster . |
| 3,266,007 | 8/1966 | Sullivan . |
| 3,322,695 | 5/1967 | Alfrey, Jr. et al. . |
| 3,549,562 | 12/1970 | Mindick et al. . |
| 3,586,646 | 6/1971 | Corte et al. . |
| 3,627,708 | 12/1971 | Morse et al. . |
| 3,637,535 | 1/1972 | Corte et al. . |
| 3,674,719 | 7/1972 | Jenkins ................... 521/183 |
| 4,137,264 | 1/1979 | Glavis et al. . |
| 4,139,684 | 2/1979 | Coupek et al. . |
| 4,191,813 | 3/1980 | Reed et al. . |
| 4,224,415 | 9/1980 | Meitzner et al. . |
| 4,245,053 | 1/1981 | Nagai et al. . |
| 4,256,840 | 3/1981 | Meitzner et al. . |
| 4,263,407 | 4/1981 | Reed Jr. ................... 521/33 |
| 4,353,853 | 10/1982 | Swift ................... 521/52 |
| 4,358,546 | 11/1982 | Naomi et al. . |
| 4,382,124 | 5/1983 | Meitzner et al. . |
| 4,444,961 | 4/1984 | Timm . |
| 4,501,826 | 2/1985 | Meitzner et al. . |
| 4,950,332 | 8/1990 | Stringfield et al. ................... 426/271 |
| 5,128,073 | 7/1992 | Allen et al. ................... 521/57 |

FOREIGN PATENT DOCUMENTS

| | | |
|---|---|---|
| 0455143A1 | 11/1991 | European Pat. Off. . |
| 2503774 | 8/1975 | Germany . |
| 203556 | 10/1983 | Germany . |
| 220964A1 | 4/1985 | Germany . |
| 220965A1 | 4/1985 | Germany . |
| 229992A1 | 11/1985 | Germany . |
| 249703A1 | 9/1986 | Germany . |
| 249274A1 | 9/1987 | Germany . |
| 249190A1 | 9/1987 | Germany . |
| 249193A1 | 9/1987 | Germany . |
| 249194A1 | 9/1987 | Germany . |
| 1011103A | 1/1989 | Japan . |
| 714367 | 8/1954 | United Kingdom . |
| 754522 | 8/1956 | United Kingdom . |
| 2210886 | 6/1989 | United Kingdom . |

OTHER PUBLICATIONS

Ullmann's Encyclopedia of Industrial Chemistry, 5th Ed., vol. A–11, (VCH Publishers, New York, New York, pp. 436–439, Dec. 1988.

Schildknecht, "Polymerization in Suspension" Interscience Publishers, Inc., New York, Chapter III, pp. 69–109, Dec. 1970.

*Primary Examiner*—James J. Seidleck
*Assistant Examiner*—John M. Cooney

[57] ABSTRACT

Novel porous copolymers are disclosed which can be used to prepare ion-exchange resins and polymeric adsorbents. The copolymers comprise a copolymer of at least one monovinylidene monomer and a crosslinking monomer and have a unique cellular pore structure. The cellular structure comprises a macroporous void phase which is dispersed within a continuous copolymer phase. The porous void phase comprises a plurality of cellular void spaces which are at least partially enclosed by walls of the continuous copolymer phase. Also disclosed are processes which can be used to prepare the porous copolymers, as well as ion-exchange resins and polymeric adsorbents using the porous copolymers.

18 Claims, 2 Drawing Sheets

POROUS COPOLYMERS HAVING A CELLULAR POLYMERIC STRUCTURE SUITABLE FOR PREPARING ION-EXCHANGE RESINS AND ADSORBENTS

BACKGROUND OF THE INVENTION

The present invention concerns polymers suitable for use in making polymeric adsorbents and ion-exchange resins. More particularly, the invention concerns porous polymers having a unique cellular polymeric structure.

Ion-exchange resins are used by industry to separate chemical species from solutions containing them. Such resins are prepared by substituting various types of functional groups onto a crosslinked polymer matrix. The functional groups are capable of associating with chemical species so as to remove them from solution. Ion-exchange resins may be cation-, anion-, or chelate-exchange resins, depending on the choice of functional group substituted onto the copolymer matrix. The polymer matrix may also be used in preparing polymeric adsorbents, such as the post-crosslinked adsorbent resins disclosed in U.S. Pat. No. 4,950,332.

The polymer matrix is typically in spheroidal bead form and is generally prepared by suspension polymerization of a finely divided organic phase within a continuous suspending medium. The organic phase comprises monovinylidene monomers like styrene, polyvinylidene monomers like divinylbenzene and a free-radical polymerization initiator. The copolymer beads produced may be microporous, i.e., gel in character, or macroporous, depending upon whether a phase-separating diluent is added to the organic phase. The term "macroporous" refers to the fact that the copolymer has both macropores and and micropores. The terms "microporous", "gel", and "macroporous" are well known in the art and generally describe the nature of the copolymer bead porosity. Microporous copolymer beads have pore sizes on the order of about 50 Angstroms (Å) or less, while macroporous copolymer beads have macropores of about 100 Å or greater. Gel and macroporous copolymer beads, as well as their preparation, are further discussed in U.S. Pat. No. 4,256,840.

Adsorbent resins based on a post-crosslinked, gel copolymer matrix can be difficult to manufacture as the gel copolymer is, in many instances, susceptible to breakage during the post-crosslinking step employed. Conventional macroporous copolymers generally have better strength relative to gel copolymers and, as a result, are less susceptible to such breakage. However, adsorbent resins derived from such conventional macroporous copolymers may have less adsorption capacity relative to the gel adsorbent resin due to a higher degree of porosity, or void space.

As can be seen, it is desirable to develop a polymerization process for producing copolymer beads which have sufficient strength to resist breakage and also capable of being converted into resins with sufficient capacity. Such copolymer beads would be advantageous for use in preparing polymeric adsorbents, as well as ion-exchange resins.

SUMMARY OF THE INVENTION

The above-described objects are obtained by the novel porous copolymer disclosed herein. The porous copolymer is obtained by polymerization of at least one monovinylidene monomer and a crosslinking monomer in the presence of a phase-separating diluent. The porous copolymer comprises a cellular polymeric structure wherein a macroporous void phase is dispersed within a continuous copolymer phase. The void phase comprises a plurality of cellular void spaces which are at least partially enclosed by walls of the continuous copolymer phase.

The above-described porous copolymer can be used in preparing ion-exchange resins and polymeric adsorbents.

Another aspect of the invention is a process for preparing a porous copolymer having a cellular polymeric structure. The process comprises polymerizing a polymerizable monomer phase comprising at least one monovinylidene monomer, a cross-linking monomer content of from about 0.3 to about 5 weight percent based on total monomer weight, an effective amount of at least one free-radical polymerization initiator, and a phase-separating diluent present in an effective amount which is sufficient to result in phase separation leading to the cellular polymeric structure.

A further aspect of the invention is a process for making a polymeric adsorbent comprising the above-described copolymer. The process comprises:

polymerizing a polymerizable monomer phase comprising at least one monovinylidene aromatic monomer, a cross-linking monomer content of from about 0.3 to about 5 weight percent based on total monomer weight, an effective amount of at least one free-radical polymerization initiator, and a phase-separating diluent present in an effective amount which is sufficient to result in phase separation leading to a porous copolymer having a cellular polymeric structure; and post-crosslinking the porous copolymer in a swollen state in the presence of a Friedel-Crafts catalyst.

DETAILED DESCRIPTION OF THE INVENTION

The porous copolymer disclosed herein has a unique cellular pore structure. This cellular structure is illustrated by FIG. 1 which is a scanning electron photomicrograph of a cross section from such a porous copolymer.

Figure 1:
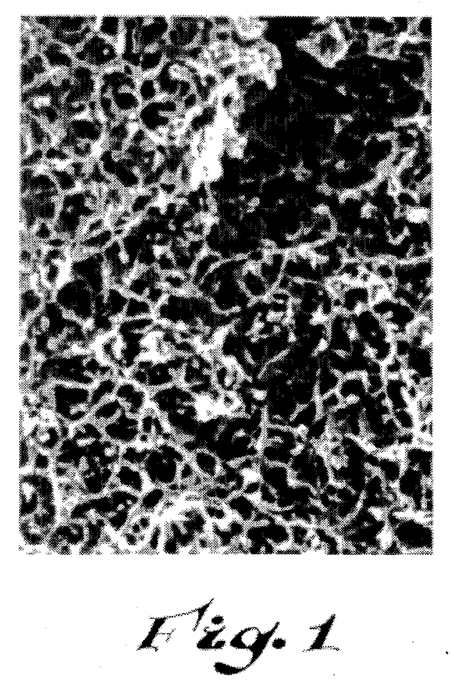
FIG. 1 is a scanning electron photomicrograph (SEM) of a cross section from a copolymer having a cellular polymeric structure as disclosed herein.

In reference to FIG. 1, it is seen that the cellular structure comprises a macroporous void phase which is dispersed within a continuous copolymer phase. The void phase is dispersed so as to form a plurality of cellular void spaces which are at least partially enclosed by walls of the continuous copolymer phase. As used herein, the term "a plurality of cellular void spaces which are at least partially enclosed by walls of the continuous copolymer phase" is intended to encompass copolymers wherein individual cellular void spaces may, or may not be, substantially completely enclosed by the continuous copolymer phase. In the event that the copolymer phase substantially completely encloses the cellular void spaces, the spaces would define a discontinuous void phase and essentially be a "closed cell" as that term is used in describing foams. Where the copolymer phase only partially encloses the cellular void spaces, the spaces would be similar in appearance to an "open cell" as that term is used in discussing foam technology. The terms open cell and closed cell are discussed in Ullmann's Encyclopedia of Industrial Chemistry, 5th Ed., Vol. A-11 (VCH Publishers New York, N.Y. 1988) at pages 436–439, the teachings of which are incorporated herein by reference. FIG. 1 is an example of a closed cell structure.

In FIG. 1, the photomicrograph was obtained by reswelling the copolymer in toluene and, finally, in iso-octane. After polymerization, the copolymer was steam distilled to remove iso-octane therein that was used as an inert diluent during polymerization. After distillation, the copolymer was dried and swollen to maximum swellability in an excess amount of toluene. Thereafter, iso-octane was gradually added to the swollen copolymer such that the toluene in the copolymer was exchanged with iso-octane. The copolymer was then dried and the photomicrograph taken thereafter. In FIGS. 2–5, the photomicrographs were taken with the respective copolymer or resins being in a dry state. The copolymer or resins were not reswollen, as described above.

The cellular void spaces within the copolymer are essentially polygonal in shape with a diameter that generally ranges from about 100 to about 2000 Å. When post-crosslinked or functionalized as described hereinafter, the cellular void spaces may appear less polygonal in shape, and in many instances will appear essentially spherical.

Figure 2:
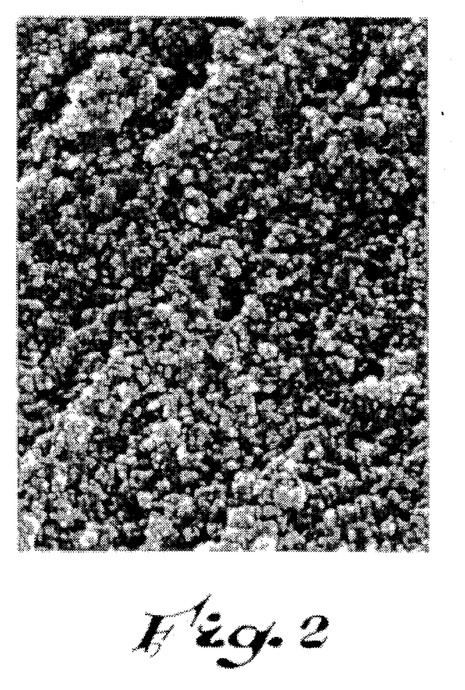
FIG. 2 is a SEM of a cross section taken from a conventional macropompous copolymer.
Figure 3:
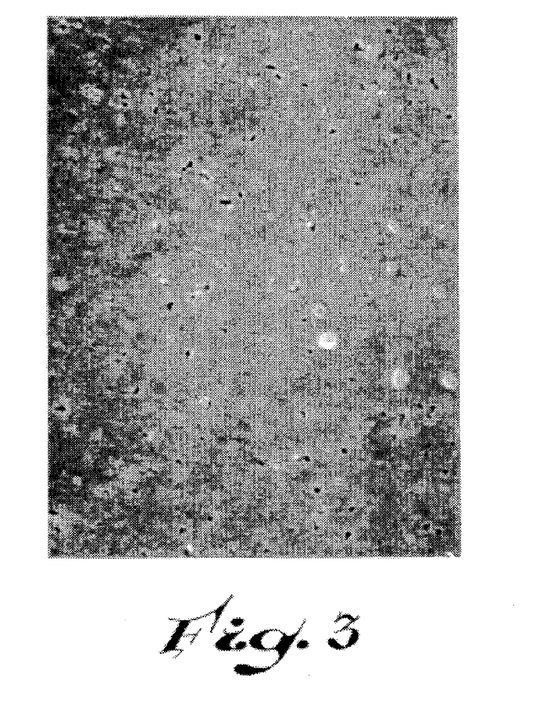
FIGS. 3–5 are SEMs of adsorbents prepared from a copolymer having a cellular polymeric structure that may be obtained by the process of Examples 3, 4, and 5, respectively, as more fully described hereinafter.

This cellular structure is substantially different when compared to the structure of a conventional macroporous or macroreticular copolymer. FIG. 2 is another scanning electron photomicrograph which illustrates a cross section from a typical macroporous or macroreticular copolymer. Macropores are seen as channels, or veins, of continuous void phase that are disposed between a continuous copolymer phase. FIG. 2 illustrates that such conventional macroporous or macroreticular copolymers have a copolymer phase consisting of an agglomerated mass of minute spherical gel copolymer particles, as described in U.S. Pat. No. 4,224,415 previously discussed herein.

In general, the copolymers of the invention are preferably prepared by suspension polymerization methods wherein a monomer mixture is suspended within an agitated, continuous suspending medium, as generally discussed in U.S. Pat. Nos. 4,256,840 and 4,382,124. The monomer mixture comprises at least one monovinylidene monomer, a cross-linking monomer, an effective amount of a phase-separating diluent, and an effective amount of a free-radical polymerization initiator. The suspending medium may contain one or more suspending agents commonly employed in the art. Polymerization is conducted by maintaining the suspension at a polymerizing temperature until reaching a desired degree of conversion of monomer to copolymer. Another suitable polymerization method is generally described in U.S. Pat. No. 4,444,961. Specific parameters required for obtaining the cellular pore structure are described below.

The cellular structure is obtained by using an effective amount of a phase-separating diluent with minor amounts of crosslinking monomer, as described hereinafter. It is also believed that the morphology of the cellular structure is promoted by adjusting the amount of free-radical polymerization initiator and the polymerization temperature.

The monomers employed are addition polymerizable ethylenically unsaturated compounds. Such monomers are well known and reference is made to Polymer Processes, edited by Calvin E. Schildknecht, published in 1956 by Interscience Publishers, Inc., New York, Chapter III, "Polymerization in Suspension" at pp 69–109 for purposes of illustration.

In Table II on pp. 78–81 of Schildknecht are listed diverse kinds of monomers suitable for practicing this invention. Of such ethylenically unsaturated monomers, of particular interest are water-insoluble monovinylidene monomers, particularly monovinylidene aromatic monomers such as styrene, vinyl naphthalene, alkylene-substituted styrenes (particularly monoalkyl-substituted styrenes such as vinyltoluene and ethylstyrene) and halo-substituted styrenes, such as bromo- or chlorostyrene and vinylbenzylchloride; acrylic monomers, such as methyl acrylate, ethyl acrylate, methyl ethyl acrylate, or methyl methacrylate; and mixtures of one or more of said monomers. Preferred monovinylidene aromatic monomers include styrene, monoalkyl-substituted styrenes, and halo-substituted styrenes. Also suitable are diverse polyvinylidene compounds which may be employed as cross-linking monomers, such as polyvinylidene aromatics like divinylbenzene, divinyltoluene, divinylxylene, divinylnaphthalene, trivinylbenzene, divinyldiphenyl ether, divinyldiphenylsulfone, as well as diverse alkylene diacrylates and alkylene dimethacrylates. Preferred crosslinking monomers are divinylbenzene, trivinylbenzene, and ethylene glycol dimethacrylate.

Relatively minor amounts of crosslinking monomer assist with formation of a cellular structure. For a preferred styrene-divinylbenzene monomer system employing a $C_{6-10}$ alkane diluent as described hereinafter, the amount of crosslinking monomer is preferably from about 0.3 to about 5 weight percent, and more preferably from about 1 to about 4 weight percent based on total weight of monomers employed. Notwithstanding the above, it should be understood that such amounts of crosslinking monomer may not be necessary for other monomer/diluent systems.

Phase-separating diluents used in preparing the porous copolymers are those which are a solvent for the monomers employed, but are non-solvents for the resulting copolymer. As such, phase separation between the resulting copolymer and the monomer phase occurs as the copolymer forms. Suitable phase-separating diluents are organic solvents which are substantially inert with respect to the suspending medium, monomers, and resulting copolymer. Generally, organic solvents having boiling points of at least about 60° C. are suitable and include aromatic hydrocarbons, aliphatic hydrocarbons, halogenated hydrocarbons, and aliphatic alcohols. Examples of suitable diluents are hexane, heptane, isooctane (2,2,4-trimethylpentane), benzene, toluene, xylene, tert-amyl alcohol, n-butanol, sec-butanol, 2-ethylhexanol, and decanol.

The amount of phase-separating diluent employed is an important parameter for obtaining a cellular structure. In general, for a given proportion of monovinylidene monomer, crosslinking monomer and initiator, and holding polymerization conditions constant, when the amount of diluent is relatively low the resulting copolymer structure is microporous, i.e., it has pores generally less than about 50 Å in size. As the amount of diluent is increased, it is believed that a transition point is reached wherein phase separation of the copolymer from the monomer/diluent phase occurs and the copolymer structure gradually changes from being essentially all microporous to one having a conventional macroporous or macroreticular structure, as illustrated by FIG. 2. As the amount of diluent is increased beyond this initial transition point, it is believed that a second transition point is reached wherein phase separation is more pronounced, and thereby gradually results in a cellular polymeric structure, as illustrated by FIG. 1. The cellular copolymers disclosed herein are obtained by using an amount of diluent which is sufficient to reach this second transition point.

As those skilled in the art can appreciate, the amount of phase-separating diluent necessary to obtain a cellular structure varies with the choice of monomers, the amount of crosslinking monomer, and diluent employed for a given polymerization. As a result, a sufficient amount of diluent must be determined more or less empirically for a given monomer-diluent system. In a preferred styrene-divinylbenzene monomer system employing a $C_{6-10}$ alkane diluent, such as hexane, heptane, or iso-octane, the amount of phase-separating diluent required is desirably from about 30 to about 80 weight percent based on the weight of the monomers and diluent. In this system, the amount of diluent is preferably from about 35 to about 50 weight percent.

The free-radical initiator may be any one or a combination of conventional initiators for generating free-radicals in the polymerization of ethylenically unsaturated monomers. Representative initiators are UV radiation and chemical initiators, such as azo-compounds like azobisisobutyronitrile; and peroxygen compounds such as benzoyl peroxide, t-butylperoctoate, t-butylperbenzoate and isopropylpercarbonate.

The free-radical initiator employed can also be used to promote formation of a cellular structure. Generally, for a given proportion of reactants and polymerization conditions, an increase in the amount of initiator can increase the size of the cells which are formed. This result is exemplified by comparison of FIGS. 4 and 5, wherein the respective examples differ essentially in the amount of initiator employed. An effective amount of free-radical initiator to obtain a cellular structure is from about 0.005 to about 10, and preferably from about 0.025 to about 2 weight percent, based on total monomer weight.

The polymerization temperature is also a parameter which can be used to promote formation of a cellular structure. The polymerization temperature is preferably higher than those typically used in suspension polymerization of ethylenically unsaturated monomers. The temperature is preferably from about 95° to about 140° C., and more preferably from about 100° to about 120° C.

In the preferred suspension polymerization methods previously described, the monomer phase is suspended within an agitated suspending medium which comprises a liquid that is substantially immiscible with the monomer phase. Due to the fact that most monomers employed herein are primarily non-polar organic compounds, a preferred suspending medium is water. Generally, the suspending medium is employed in an amount from about 30 to about 70, and preferably from about 35 to about 50 weight percent based on total weight of the monomer mixture and suspending medium. Various suspending agents are conventionally employed to assist with maintaining a relatively uniform suspension of monomer droplets within the suspending medium. Illustrative suspending agents are gelatin, polyvinyl alcohol, magnesium hydroxide, hydroxyethylcellulose, methylcelluloses, and carboxymethylmethylcellulose. The amount of suspending agent used can vary widely depending on the monomers and suspending agents employed.

The porous copolymer beads obtained by the above-described suspension polymerization methods are essentially spheroidal in shape and have diameters which can vary widely, as those skilled in the art can appreciate. For most uses, bead diameters may be from about 50 to about 5000 µm.

An adsorbent resin can be prepared from the resulting copolymer by post-crosslinking individual polymer chains after polymerization. Post-crosslinking may be achieved by swelling the copolymer with a swelling agent and subsequently reacting the copolymer with a polyfunctional alkylating or acylating agent, as is described in U.S. Pat Nos. 4,191,813 and 4,263,407, the teachings of which are incorporated herein by reference.

To obtain an adsorbent such as that described in U.S. Pat. No. 4,950,332 previously mentioned, the porous copolymer beads may be post-crosslinked in a swollen state in the presence of a Friedel-Crafts catalyst to introduce rigid microporosity (pores with a diameter of about 50 Å or less) into the copolymer. In this type of process, the copolymer should be prepared from a monomer mixture comprising a monovinylidene aromatic monomer, as the post-crosslinking step requires the presence of aromatic rings on individual polymer chains. Small amounts of non-aromatic monovinylidene monomers, preferably less than about 30 weight percent based on monomer weight, can be employed in the monomer mixture being polymerized, but it is less desirable to do so as the resulting adsorbents may have decreased amounts of surface area and microporosity. Post-crosslinking of the copolymer while it is in a swollen state displaces and rearranges adjacent polymer chains, thereby causing an increase in the number of micropores. This rearrangement serves to increase overall porosity and surface area of the copolymer, while also decreasing the average pore size. Post-crosslinking also serves to impart rigidity to the copolymer structure, which is important for providing enhanced physical and dimensional stability to the copolymer.

A preferred method for post-crosslinking the copolymer comprises haloalkylating the copolymer with a haloalkylating agent, swelling the resulting haloalkylated copolymer with an inert swelling agent, and thereafter maintaining the swollen, haloalkylated copolymer at a temperature and in the presence of a Friedel-Crafts catalyst such that haloalkyl moieties on the copolymer react with an aromatic ring of an adjacent copolymer chain to form a bridging moiety. It is also preferred to substantially remove excess haloalkylating agent and/or solvents employed in haloalkylating the copolymer prior to post-crosslinking to obtain good quality copolymer and high surface area. This type of method is described in U.S. Pat. No. 4,950,332, the relevant teachings of which are incorporated herein by reference.

In general, haloalkylation is achieved by contacting the copolymer with a haloalkylating agent under conditions sufficient to substitute the copolymer with haloalkyl moieties. A preferred haloalkylating agent is chloromethylmethylether. Preferably, the copolymer is haloalkylated by first swelling it under non-reactive conditions with the haloalkylating agent and an effective amount of a Friedel-Crafts catalyst. The haloalkylating agent advantageously has the Friedel-Crafts catalyst incorporated therein. The swollen copolymer beads are then maintained at a temperature sufficient to react the haloalkylating agent with the copolymer beads until achieving a desired degree of reaction. In preparing the adsorbent materials herein, the porous copolymer is preferably halomethylated and most preferably chloromethylated. Methods for haloalkylating copolymer particles are known. Illustrative of such are U.S. Pat. Nos. 2,642,417; 2,960,480; and 2,992,544, the relevant teachings of which are incorporated herein by reference. Chloromethylmethylether is commonly employed as a haloalkylating agent. After haloalkylation, it is preferred to remove excess haloalkylating agent and/or solvents used during haloalkylation, as mentioned above. This can be accomplished by any method, such as washing with an organic solvent like methanol, or drying.

After haloalkylation, the copolymer is contacted with a swelling agent to expand the copolymer structure. Suitable swelling agents are solvents which are substantially inert during post-crosslinking of the haloalkylated copolymer and include chlorinated hydrocarbons, such as dichloroethane, chlorobenzene, dichlorobenzene, ethylene dichloride, methylene chloride, and propylene dichloride; or nitrogen-substituted aromatics, like nitrobenzene. A preferred swelling agent is dichloroethane. Advantageously, the copolymer is allowed to swell in an excess amount of the swelling agent for at least about 30 minutes. Preferably, the copolymer is contacted with the swelling agent for a time sufficient to substantially attain equilibrium with respect to swelling of the particular swelling agent employed. It is also generally convenient to dissolve the Friedel-Crafts catalyst employed in the subsequent post-crosslinking reaction within the swelling agent.

Once swollen, the haloalkylated copolymer is maintained at a temperature and in the presence of a Friedel-Crafts catalyst such that the bridging moieties are formed by reaction of the haloalkyl moieties with an adjacent aromatic ring. Suitable catalysts are those discussed in connection with haloalkylation. Preferably, the reaction temperature can be from about 20° to about 180° C. for a period of at least about 0.5 hours. More preferably, the temperature is from about 60° to about 85° C. Where the copolymer is chloromethylated, reaction of a chloromethyl group with the aromatic ring of an adjacent copolymer chain results in formation of a methylene bridge, i.e., a —CH2— moiety, between two copolymer chains. After formation of the bridging moiety, the swelling agent is removed by conventional methods, such as solvent extraction, washing, drying, or a combination thereof. If a drying step is used, it is preferred to avoid an oxygen-containing atmosphere at temperatures above normal room temperature.

After post-crosslinking, the resulting polymeric adsorbent desirably has a specific surface area of at least about 600 square meters per gram ("m2/g") of dry adsorbent resin, preferably at least about 1000, more preferably at least about 1200 m2/g. Specific surface area may be determined by well-known BET nitrogen adsorption techniques.

In terms of porosity, the adsorbent preferably has from about 0.5 to about 1.5 cubic centimeters of pore volume per gram of adsorbent material ("cc/g"). Most preferably, the adsorbent has from about 0.7 to about 1.3 cc/g of porosity.

If desired, the porous copolymer beads may be converted to ion-exchange resins by functionalizing them with ion-exchange or chelate-exchange functional groups. Techniques for converting copolymers to anion-, cation-, and chelate-exchange resins are known.

In preparing anion- and chelate-exchange resins from poly(vinylaromatic) copolymer beads, such as crosslinked polystyrene beads, the beads are first haloalkylated, preferably chloromethylated, and the anion- or chelate-exchange groups are subsequently substituted onto the haloalkylated copolymer. The porous copolymer beads may be haloalkylated by the methods previously described.

Anion- or chelate-exchange resins may be prepared from the haloalkylated beads by contact with an amine compound capable of replacing the halogen of the haloalkyl group with an amine-based functional group. Suitable compounds and methods for preparing such resins are also illustrated in the patents previously discussed concerning haloalkylation.

Weak-base anion resins may be prepared by contacting the haloalkylated copolymer beads with ammonia, a primary amine, a secondary amine, or polyamines like ethylene diamine or propylene diamine. Commonly employed primary and secondary amines include methylamine, ethylamine, butylamine, cyclohexylamine, dimethylamine, and diethylamine.

Strong-base anion resins may be prepared by contact with tertiary amines, such as trimethylamine, triethylamine, dimethylisopropanolamine, or ethylmethyl propylamine.

Chelate resins may be prepared, for example, by contacting the haloalkylated copolymer beads with an aminopyridine compound, such as a 2-picolylamine. Chelate-exchange resins may also be prepared by contacting the haloalkylated copolymer beads with a primary amine to initially convert the copolymer beads to a weak-base anion-exchange resin, followed by contact with a carboxyl-containing compound, like chloroacetic acid, as described in U.S. Pat. No. 2,888,441.

Amination typically comprises contacting the haloalkylated copolymer beads with an amine compound at a temperature of from about 25° C. to about 150° C. for at least about 1 hour.

Cation-exchange resins may be prepared from the copolymer beads using methods illustrated by U.S. Pat. Nos. 3,266,007; 2,500,149; 2,631,127; 2,664,801; and 2,764,564, the relevant teachings of which are incorporated herein. In general, strong acid resins are prepared by reacting the copolymer with a sulfonating agent such as sulfuric acid, chlorosulfonic acid, or sulfur trioxide. Contact with the sulfonating agent can be conducted neat, or with a swelling agent. Contact may be conducted at temperatures from about 0° C. to about 150° C.

The resulting cation-exchange resin may be converted to a desired metal salt form by contact with an aqueous solution of a salt or base containing the desired metal counterion. For example, the resin can be converted to its calcium form by contact with a CaCl2 or Ca(OH)2 solution. The resin can be converted to other forms in like manner using suitable water-soluble salts of the desired metal.

Specific Embodiments of the Invention

The following examples are intended to illustrate the invention and should not be construed to limit the scope of the appended claims. All parts and percentages are by weight and all temperatures are in degrees Celsius (°C.), unless otherwise indicated.

EXAMPLES 1–10

Examples 1–10 concern preparation of copolymers having a cellular polymeric structure and also preparation of adsorbents by post-crosslinking the copolymers.

A suitable polymerization kettle equipped with agitation is charged with a monomer phase composed of measured amounts of styrene, a divinylbenzene mixture obtained from The Dow Chemical Company containing 55 weight percent divinylbenzene and 45 weight percent ethylvinylbenzene based on weight of the mixture, commercial grade isooctane, and t-butylperbenzoate (t-BPB) and t-butylperoctoate (t-BPO) as free-radical initiators. The proportion of each component, in terms of a weight percentage, employed in a particular example is listed in Table I. After charging the kettle with the monomer phase, an aqueous phase composed of water, sodium dichromate, and carboxymethylmethylcellulose (CMMC) is added. The proportion of monomer phase to aqueous phase employed is 1:1. The proportion of specific aqueous phase components, also in terms of a weight percentage, are listed in Table I.

reactor contents are then maintained at a temperature of 45° C. for about 2.5 hours. The reactor contents are cooled and washed with an excess amount of methanol to remove the CMME from the beads. Excess liquid is removed from the

TABLE I

MATERIALS AND CONDITIONS EMPLOYED IN EXAMPLES 1–10

| Example No. | Styrene (%)[1] | DVB (%)[1] | Diluent (%)[2] | t-BPO (%)[3] | t-BPB (%)[3] | Sodium Dichromate (%)[4] | CMMC (%)[4] | Initial Temp (°C.) | Initial Time (hrs) | Finish Temp (°C.) | Finish Time (hrs) |
|---|---|---|---|---|---|---|---|---|---|---|---|
| 1 | 99.25 | 0.75 | 42 | 0 | 0.2 | 0.17 | 0.2 | 100 | 18 | 110 | 2 |
| 2 | 98.5 | 1.5 | 35 | 0.1 | 0.2 | 0.17 | 0.2 | 110 | 9 | — | — |
| 3 | 98.5 | 1.5 | 35 | 0.5 | 0.2 | 0.17 | 0.2 | 110 | 9 | — | — |
| 4 | 98.5 | 1.5 | 40 | 0.1 | 0.2 | 0.17 | 0.2 | 110 | 9 | — | — |
| 5 | 98.5 | 1.5 | 40 | 0.5 | 0.2 | 0.17 | 0.2 | 110 | 9 | — | — |
| 6 | 98.5 | 1.5 | 45 | 0.025 | 0.2 | 0.17 | 0.2 | 110 | 9 | — | — |
| 7 | 98.5 | 1.5 | 45 | 0.1 | 0.2 | 0.17 | 0.2 | 110 | 9 | — | — |
| 8 | 98.5 | 1.5 | 45 | 0.15 | 0.2 | 0.17 | 0.2 | 80 | 10 | 110 | 5 |
| 9 | 98.5 | 1.5 | 50 | 0.5 | 0.2 | 0.17 | 0.2 | 110 | 9 | — | — |
| 10 | 98 | 2 | 45 | 0.05 | 0.2 | 0.17 | 0.2 | 110 | 9 | — | — |

[1] % DVB or styrene = $\dfrac{\text{weight styrene or divinylbenzene}}{\text{total monomer weight}}$

[2] % Diluent = $\dfrac{\text{weight diluent}}{\text{total weight of monomers + diluent}}$

[3] % t-BPB or t-BPO = $\dfrac{\text{weight of initiator}}{\text{total monomer weight}}$

[4] % Sodium Dichromate or CMMC = $\dfrac{\text{weight of component}}{\text{total weight of aqueous phase}}$ After adding the monomer and aqueous phases, the kettle is sealed and purged with nitrogen. Agitation is initiated to size the monomer phase into droplets. The kettle contents are heated to an initial polymerization temperature (Initial Temperature) as indicated in Table I and, subsequently, maintained at this temperature for a time (Initial Time) also indicated in Table I to obtain porous copolymer beads. In two of the examples, the respective polymerizations are concluded by increasing the temperature to a temperature (Finish Temperature) and for a time (Finish Time) as indicated in Table I to more fully complete polymerization. The kettle contents are then allowed to cool to room temperature. The porous copolymer beads are recovered from the kettle, washed with water, and iso-octane is removed by steam distillation. The beads are finally allowed to dry at room temperature.

The porous copolymer beads are then post-crosslinked by substituting the copolymer with chloromethyl groups, washing the beads to remove excess haloalkylating agent, swelling the chloromethylated copolymer beads with an inert swelling agent, and then reacting the chloromethyl groups in the presence of a Friedel-Crafts catalyst. For each example, a 30 gram portion of the respective beads and 500 milliliters (ml) of chloromethylmethylether (CMME) are placed in a 1 liter reactor. The copolymer beads are allowed to swell with the CMME under moderate agitation for 30 minutes. Thereafter, 9 grams of ferric chloride is added to the reactor. The reactor and the chloromethylated beads are again washed with methanol and finally recovered from the reactor.

The resulting methanol-moist chloromethylated beads are swollen with an excess amount of 1,2-dichloroethane (EDC) in a 1 liter reactor. Thereafter, the reactor contents are heated to distill off any residual amount of methanol from the beads. Upon reaching an overhead product temperature of 82° C., distillation is discontinued and the beads are allowed to cool to about 20° C. A 9 gram amount of ferric chloride catalyst is added to the reactor and the cooled beads are allowed to contact the catalyst for about 30 minutes. The beads are then heated and maintained at a temperature of 80° C. for 3 hours. After cooling the resulting adsorbent beads to room temperature, the EDC is extracted by rinsing the beads five times with methanol. The adsorbent beads are dried overnight in an oven at 120° C.

Figure 4:
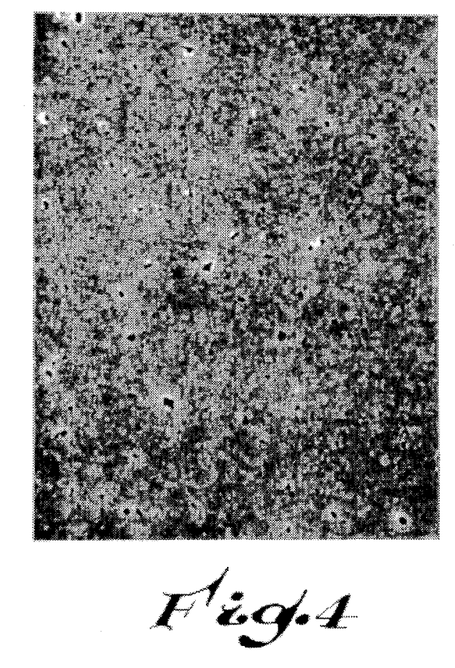
Figure 5:
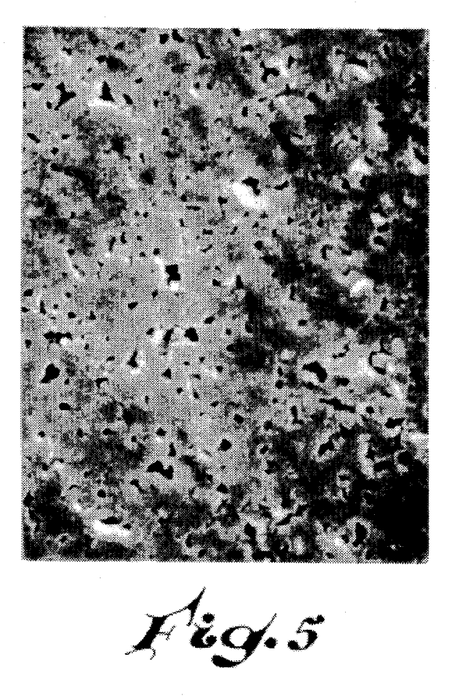

After drying, the beads are analyzed to determine the various physical properties listed in Table II. The presence of a cellular polymeric structure is also confirmed by scanning electron microscopy. FIGS. 4, 5, and 6 illustrate the structures obtainable from the methods of Examples 3, 4, and 5 respectively. The figures illustrate a structure wherein a discontinuous porous void phase is dispersed within a continuous copolymer phase, as previously described herein.

TABLE II

PHYSICAL PROPERTY DATA FOR EXAMPLES 1–10

| Example No. | Vol. Avg. Diameter of Adsorbent (μm) | Crush Strength (g/bead) | Whole Beads (%) | Specific Surface Area (m²/g) | Total Porosity (cc/g) | Porosity >100Å (cc/g) |
|---|---|---|---|---|---|---|
| 1 | 799 | 240 | 99 | 1150 | 1.207 | 0.400 |
| 2 | 840 | 612 | 99 | 1278 | 0.934 | 0.074 |
| 3 | 670 | 670 | 99 | 1310 | 1.174 | 0.050 |

TABLE II-continued

PHYSICAL PROPERTY DATA FOR EXAMPLES 1–10

| Example No. | Vol. Avg. Diameter of Adsorbent ($\mu$m) | Crush Strength (g/bead) | Whole Beads (%) | Specific Surface Area (m$^2$/g) | Total Porosity (cc/g) | Porosity >100Å (cc/g) |
|---|---|---|---|---|---|---|
| 4 | 670 | 456 | 98 | 1376 | 1.059 | 0.040 |
| 5 | 666 | 666 | 97 | 1220 | 1.102 | 0.055 |
| 6 | 662 | 485 | 99 | 1409 | 1.255 | 0.139 |
| 7 | 1521 | 1147 | 96 | 1250 | 1.025 | 0.092 |
| 8 | 780 | 1464 | 100 | 1158 | 0.961 | 0.223 |
| 9 | 584 | 666 | 99 | 895 | 0.730 | 0.225 |
| 10 | 808 | 1110 | 95 | 986 | 0.901 | 0.254 |

Crush Strength is determined by taking a representative sample of at least about 20 beads from a given sample of adsorbent or copolymer beads, and determining the force, in grams, needed to fracture each bead using a Chatilion Scale, Model DPP-1KG, available from J. Chatilion & Sons Company. Crush strength is reported as the average of the force measurements obtained for the 20 beads.

Volume average particle diameters are determined by use of a particle size analyzer obtained from the HIAC-Royco Company.

The number of whole beads, expressed as a percent, is determined by microscopic examination of a representative sample of at least about 200 beads. The number of substantially spherical beads in the sample is determined and a percentage is calculated therefrom.

Porosity and specific surface area data are determined by well-known BET nitrogen adsorption techniques.

EXAMPLES 11–12

The procedure of Examples 1–10 is substantially repeated, except that methyl methacrylate (MMA) is added to the monomer phase being polymerized.

The proportions of materials added to the kettle and polymerization temperature is listed in Table III. The proportion of monomer phase to aqueous phase employed is also 1:1. The physical properties of the resulting adsorbents are listed in Table IV.

TABLE IV

PHYSICAL PROPERTY DATA FOR EXAMPLES 11–12

| Example No. | Vol. Avg. Diameter of Adsorbent ($\mu$m) | Crush Strength (g/bead) | Whole Beads (%) | Specific Surface Area (m$^2$/g) | Total Porosity (cc/g) |
|---|---|---|---|---|---|
| 11 | 802 | 429 | 82 | 1232 | 0.542 |
| 12 | * | 1812 | 97 | 454 | 0.895 |

*not determined

EXAMPLE 15

Example 15 concerns preparation of a post-crosslinked, anion-exchange resin from a copolymer having a cellular polymeric structure.

A 3 liter polymerization kettle equipped with agitation is charged with a monomer phase composed of 744.9 grams of styrene, 10.1 grams of a divinylbenzene mixture obtained from The Dow Chemical Company containing 55 weight percent divinylbenzene and 45 weight percent ethylvinylbenzene based on weight of the mixture (a divinylbenzene content of 0.75 weight percent based on total monomer weight), 546 grams of iso-octane (42 percent by weight based on weight of monomer and diluent), and 7.6 grams of t-butylperbenzoate (t-BPB) as a free-radical initiator. After

TABLE III

MATERIALS AND CONDITIONS EMPLOYED IN EXAMPLES 11 and 12

| Example No. | Styrene (%)[1] | MMA (%)[1] | DVB (%)[1] | Diluent (%)[2] | t-BPO (%)[3] | t-BPB (%)[3] | Sodium Dichromate (%)[4] | CMMC (%)[4] | Temp (°C.) |
|---|---|---|---|---|---|---|---|---|---|
| 11 | 88.5 | 10 | 1.5 | 35 | 0.1 | 0.2 | 0.17 | 0.2 | 110 |
| 12 | 64.5 | 34 | 1.5 | 45 | 0.05 | 0.2 | 0.17 | 0.2 | 110 |

[1] % monomer = $\dfrac{\text{weight of an individual monomer}}{\text{total monomer weight}}$

[2] % Diluent = $\dfrac{\text{weight diluent}}{\text{total weight of monomers + diluent}}$

[3] % t-BPB or t-BPO = $\dfrac{\text{weight of component}}{\text{total monomer weight}}$

[4] % Sodium Dichromate or CMMC = $\dfrac{\text{weight of component}}{\text{total weight of aqueous phase}}$ charging the kettle with the monomer phase, an aqueous phase composed of 1040 grams of deionized water, 3.3 grams of a 67 percent aqueous sodium dichromate solution, and 260 grams of a 1 percent aqueous CMMC solution is added.

After adding the monomer and aqueous phases, the kettle is sealed and purged with nitrogen. Agitation is initiated to size the monomer phase into droplets. The kettle contents are heated to a temperature of 100° C. and maintained at that temperature for 18 hours. The polymerization was completed by heating the kettle contents to a temperature of 110° C. and maintaining the temperature for 2 hours. The kettle contents are then allowed to cool to room temperature. The beads are recovered from the kettle, washed with water, and iso-octane is removed therefrom by steam distillation. The beads are allowed to dry at room temperature. The presence of a cellular structure is confirmed by scanning electron microscopy.

A 30 gram portion of the copolymer beads is placed with 600 ml of CMME in a 1 liter reactor. The copolymer beads are allowed to swell with the CMME under moderate agitation for 30 minutes. Thereafter, 9 grams of ferric chloride is added to the reactor. The reactor contents are then maintained at a temperature of 45° C. for about 3 hours. The reactor contents are cooled and washed with an excess amount of methanol to remove the CMME from the beads. Excess liquid is removed from the reactor and the chloromethylated beads are again washed with methanol.

The resulting methanol-moist chloromethylated beads are swollen with an excess amount of 1,2-dichloroethane (EDC) in a 1 liter reactor. Thereafter, the reactor contents are heated to distill off any residual amount of methanol from the beads. Upon reaching an overhead product temperature of 82° C., distillation is discontinued and the beads are allowed to cool to about 20° C. A 9 gram amount of ferric chloride catalyst is added to the reactor and the cooled beads are allowed to contact the catalyst for about 30 minutes. The beads are then heated and maintained at a temperature of 80° C. for 3 hours. After cooling the resulting adsorbent beads to room temperature, the EDC is extracted by rinsing the beads five times with methanol. The adsorbent beads are dried overnight in an oven at 120° C.

The copolymer beads are then aminated with dimethylamine. An excess amount of aqueous dimethylamine solution is added to the beads in a 1 liter reactor, along with 500 grams of water. The beads are then heated to a temperature of 70° C. and maintained at that temperature for 1 hour.

The physical properties of the resulting resin are determined as in Examples 1–10. The resin has the following properties: a volume average particle diameter of 799 μm, 99 percent whole beads, 240 g/bead crush strength, and a water retention capacity of 77 percent. Water retention capacity is determined by well-known methods.

What is claimed is:

1. A suspension polymerization process for preparing porous copolymer beads having a cellular polymeric pore structure wherein a macroporous void phase is dispersed within a continuous copolymer phase, the void phase comprising a plurality of cellular void spaces having diameters of from about 100 to about 2000 angstroms (Å) which are at least partially enclosed by walls of the continuous copolymer phase which comprises contacting in the polymerizable monomer phase at least one monovinylidene monomer a crosslinking monomer in an amount of from about 0.3 to about 5 weight percent based on total monomer weight, at least one free-radical polymerization initiator in an amount of from about 0.025 to about 2 weight percent based on the monomer weight, and a phase-separating diluent present in an amount of from about 30 to about 80 weight percent based on weight of monomer and diluent at a temperature from about 95° to about 140° C.

2. The process of claim 1 wherein the at least one free-radical polymerization initiator is selected from t-butylperoctoate, t-butylperbenzoate, benzoyl peroxide, or iso-propylpercarbonate.

3. The process of claim 1 wherein the cross-linking monomer is present in an amount from about 1 to about 4 weight percent based on total monomer weight.

4. The process of claim 1 wherein the at least one monovinylidene monomer is selected from styrene, vinylbenzyl chloride, vinyltoluene, or ethylstyrene.

5. The process of claim 1 wherein the crosslinking monomer is divinylbenzene, trivinylbenzene, or ethylene glycol dimethacrylate.

6. The process of claim 1 wherein the at least one monovinylidene monomer is styrene and the crosslinking monomer is divinylbenzene.

7. The process of claim 6 wherein the phase-separating diluent is a $C_{6-10}$ alkane.

8. The process of claim 6 wherein the phase-separating diluent is selected from hexane, heptane, or iso-octane.

9. The process of claim 8 wherein polymerization is conducted at a temperature from about 100° to about 120° C.

10. The process of claim 1 further comprising functionalizing the porous copolymer beads with ion-exchange or chelate-exchange groups.

11. The porous copolymer beads produced by the process of claim 1.

12. An ion-exchange or chelate-exchange resin produced by the process of claim 10.

13. A process for making a polymeric adsorbent resin which comprises:

(a) contacting in a suspended polymerizable monomer phase at least one monovinylidene aromatic monomer, a crosslinking monomer in an amount of from about 0.3 to about 5 weight percent based on total monomer weight, at least one free-radical polymerization initiator in an amount of from about 0.025 to about 2 weight percent based on the monomer weight, and a phase-separating diluent present in an amount of from about 30 to about 80 weight percent based on weight of monomer and diluent at a temperature of from about 95° to about 140° C. to produce porous copolymer beads having a cellular polymeric pore structure wherein a macroporous void phase is dispersed within a continuous copolymer phase, the void phase comprising a plurality of cellular void spaces having diameters of from about 100 to about 2000 angstroms (Å) which are at least partially enclosed by walls of the continuous copolymer phase; and (b) post-crosslinking the porous copolymer beads in a swollen state in the presence of a Friedel-Crafts catalyst.

14. The process of claim 13 wherein post-crosslinking is conducted by steps which comprise:

removing the phase-separating diluent from the porous copolymer beads;

contacting the copolymer beads with a haloalkylating agent under conditions sufficient to substitute the copolymer with haloalkyl moieties;

removing any excess haloalkylating agent from the copolymer beads;

swelling the copolymer beads with an inert swelling agent;

maintaining the swollen copolymer beads at a temperature and in the presence of a Friedel-Crafts catalyst such that individual haloalkyl moieties on a copolymer chain react with an aromatic ring of an adjacent copolymer chain to form a bridging moiety; and thereafter removing the swelling solvent from the copolymer beads.

15. The process of claim 14 wherein the haloalkyl moieties are chloromethyl groups.

16. The process of claim 14 wherein the haloalkylating agent is chloromethylmethylether.

17. The process of claim 15 wherein the bridging moiety is a —$CH_2$— moiety.

18. The process of claim 14 wherein the swelling solvent is 1,2-dichloroethane.

* * * * *